United States Patent [19]

Avery et al.

[11] Patent Number: 5,205,991
[45] Date of Patent: Apr. 27, 1993

[54] MANUFACTURE OF EXTRUDED CERAMICS

[75] Inventors: James F. Avery, Horseheads; Edward C. Fletcher; Trevor A. Francis, both of Corning; Tudor C. Gheorghiu; Larry J. Zook, both of Painted Post, all of N.Y.

[73] Assignee: Corning Incorporated, Corning, N.Y.

[21] Appl. No.: 737,485

[22] Filed: Jul. 30, 1991

[51] Int. Cl.[5] .......................... B01J 19/00; F26B 3/08; B29C 47/88

[52] U.S. Cl. .................................. 422/129; 422/286; 422/297; 34/10; 34/57 A; 34/57 R; 425/72.1; 425/445; 264/211.11; 264/211.12; 264/211.13; 406/88

[58] Field of Search .................. 264/211.11, 211.12, 264/211.13, 72.1, 555, 65, 66; 425/72.1, 445; 34/57 A, 57 R, 10; 406/86, 88, 89; 422/129, 233, 237, 238, 286, 287, 297

[56] References Cited

U.S. PATENT DOCUMENTS

| | | | |
|---|---|---|---|
| 2,781,589 | 2/1957 | Cornwell | 34/12 |
| 3,610,696 | 10/1971 | Fulton | 34/57 R |
| 3,873,163 | 3/1975 | Gladish | 406/88 |
| 4,452,752 | 6/1984 | Harder et al. | 264/555 |
| 4,630,975 | 12/1986 | Becker | 406/85 |
| 4,810,458 | 3/1989 | Oshima et al. | 264/555 |
| 4,857,245 | 8/1989 | Oshima et al. | 264/25 |
| 4,866,857 | 9/1989 | Clasen | 34/10 |

Primary Examiner—Robert J. Warden
Assistant Examiner—Christopher Y. Kim
Attorney, Agent, or Firm—Angela N. Nwaneri

[57] ABSTRACT

The present invention features a process and apparatus for fabricating ceramic substrates. The apparatus comprises an extruder of the ram or screw type for forcing the ceramic materials through a die to form a log. After leaving the extrusion die, the log enters a conveyor apparatus. The log is conveyed over, and supported upon, a gaseous fluid (air) bearing surface of the conveyor apparatus, until it reaches a dryer carrier. The conveyor apparatus features a support surface for carrying the ceramic materials. The support surface has a plurality of apertures through which the gaseous fluid (air) is directed for supporting the moving log. About the support surface is disposed a mantle for confining the gaseous fluid (air) about the rapidly drying ceramic log. The gaseous fluid (air) is maintained at a relative humidity of approximately between 85 to 97%, and preferably within an approximate range of between 90 and 95%. The mantle ensures that the gaseous fluid (air) surrounding and bathing the conveyed log is continuously maintained at substantially constant humidity within the specified range, in order to prevent the formation of fissures on the surface of the ceramic log.

8 Claims, 2 Drawing Sheets

MANUFACTURE OF EXTRUDED CERAMICS

FIELD OF THE INVENTION

The invention relates to a process and apparatus for extruding ceramic substrates utilized in catalytic converters, and more particularly to a manufacturing system incorporating humidity control for producing catalyst ceramic support materials substantially free of fissures and related defects.

BACKGROUND OF THE INVENTION

It has been a long standing manufacturing problem to efficiently produce ceramic monoliths. Ceramics with skin related flaws, known in the trade as "fissures," account for approximately 37% of all the rejects. The fissures are focal points of stress and heat differentials in the ceramic support during automotive exhaust gas cycling. These small cracks cannot be tolerated because they eventually spread and cause failure of the catalytic support material.

From the beginning of ceramic substrate manufacture, fissure formation has been a constant source of perplexity. The fissure problem became even more exacerbated when the extrusion system was upgraded in the plant from a ram fed, batch-type process to a screw fed, continuous-type process. The continuous-type process created a higher percentage of fissure related rejects. The increase in failures forced more attention to be given to the elimination of the problem, with the result that the cause of the difficulty was finally ascertained.

The ceramic material leaves the extruder die as a long tubular mass, referred to as a "log." As the log leaves the extruder, it is conveyed by air bearings to a ceramic carrier contoured to the shape of the log. The ceramic logs are dielectrically dried, wherein the water molecules in the material are converted to steam that readily escapes through the porous ceramic structure. The dried logs are then cut and fired to form the catalyst material supports.

It is during the travel to the ceramic dryer carrier that the surface of the log cracks. The log leaving the extruder is usually warmer than the ambient air. Water evaporation from the substrate begins immediately upon its exit from the extruder die. The underside of the log dries faster than the rest of the material by virtue of the air jet convective drying of the undersurface of the ware. It is theorized that a stress differential is created between the top and bottom surfaces of the log causing fissures to form, especially on the top surface. The fissures form to alleviate the stress created between the quicker shrinking bottom surface layer and the top layer.

It was suggested that the humidity be raised to 100% in the air being forced through the air bearing jets. This, however, did not prove a satisfactory solution. The ceramic material having a high percentage of fine clays becomes tacky when its surface is wetted. The tacky surface is then difficult to convey over the air bearings to the dryer carrier.

Rather, it was discovered, only a given range of air jet humidity provides satisfactory results. Too wet, and the log became tacky and hard to convey over the air bearing surfaces. Too dry, and fissures continue to form on the log.

Also, it was observed, differential shrinkage would still persist where the log was not jacketed to prevent the moist air from escaping from about the surfaces of the log. Thus, a mantle was built about the air bearing support to confine the humidity to the vicinity of its application.

The relative humidity of the air flow in the bearings necessary to prevent fissuring has been observed to lie within well defined limits. The relative humidity has to be within the approximate range of between 85 to 97%, with a preferred operating range approximately being between 90 and 95%. Within this relative humidity range, the temperature of the air, however, has not been found to make a significant difference in the fissure phenomenon. The general temperature range for the air during the humidity testing fell between 65° and 105° F.

DISCUSSION OF RELATED ART

U.S. Pat. No. 2,781,589, issued to R.E. Cornwell on Feb. 19, 1957, entitled "Method and Apparatus for Processing Plastic Tubing," discloses a technique of adding humidity to the drying medium, such as air, to dry plastic tubing. Nozzles are disposed in a manner that allows the drying medium to contact the entire exterior of the tubing. The distance between nozzles and tubing is adjustable. No teaching of preferred humidity range(s) or the control thereof is disclosed in this patent, nor is a gaseous fluid bearing surface suggested.

U.S. Pat. No. 3,610,696, issued to Fulton on Oct. 5, 1971, entitled "Fluid-Operated Conveyor," teaches that fluidizable and non-fluidizable materials alike can be conveyed utilizing a gaseous conveyor. The conveyor bed allows warm or cool air to be directed through apertures to support the materials in question. There is no suggestion, however, that such an apparatus includes means to control the humidity of the gaseous fluids.

Similarly, in U.S. Pat. No. 4,144,021, issued to Neumann on Mar. 13, 1979, entitled "Fluid Rail Conveying Apparatus," a heating device is described that can be incorporated in the fluid (air) supply system. Again, however, no mention or suggestion is made with respect to the control of the humidity of air.

SUMMARY OF THE INVENTION

In accordance with the present invention, there is provided a process and apparatus for fabricating ceramic substrates. The apparatus comprises an extruder of the ram or screw type for forcing the ceramic materials through a die to form a log. After leaving the extrusion die, the log enters a conveyor apparatus. The log is conveyed over and supported upon a gaseous fluid (air) bearing surface of the conveyor apparatus, until it reaches a dryer carrier.

The conveyor apparatus features a support surface for carrying the ceramic materials. The support surface has a plurality of apertures through which the gaseous fluid (air) is directed for supporting the moving log. About the support surface is disposed a mantle for confining the gaseous fluid (air) about the rapidly drying ceramic log. The gaseous fluid (air) is maintained at a relative humidity of approximately between 85 to 97%, and preferably within an approximate range of between 90 and 95%. The mantle ensures that the gaseous fluid (air) surrounding and bathing the conveyed log is continuously maintained at substantially constant humidity within the specified range to prevent the formation of fissures on the surface of the ceramic log.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention provides a manufacturing system and method for fabricating catalyst support materials for automotive catalytic converters, such as ceramic monoliths. A ceramic material that has been found useful for this purpose is cordierite. The ceramic materials can be either batch processed or continuously processed. The materials are mixed and then extruded through a die. The extruder apparatus can comprise either a ram (batch process) or a screw feed (continuous process) that forces the materials through the die, forming the material into a log. After leaving the die, the ceramic log is supported and conveyed upon an air bearing surface to a dryer carrier. It is during this conveying process that humidification is required. Eventually, the logs are cut, dried and fired for subsequent catalyst coating.

Figure 1:
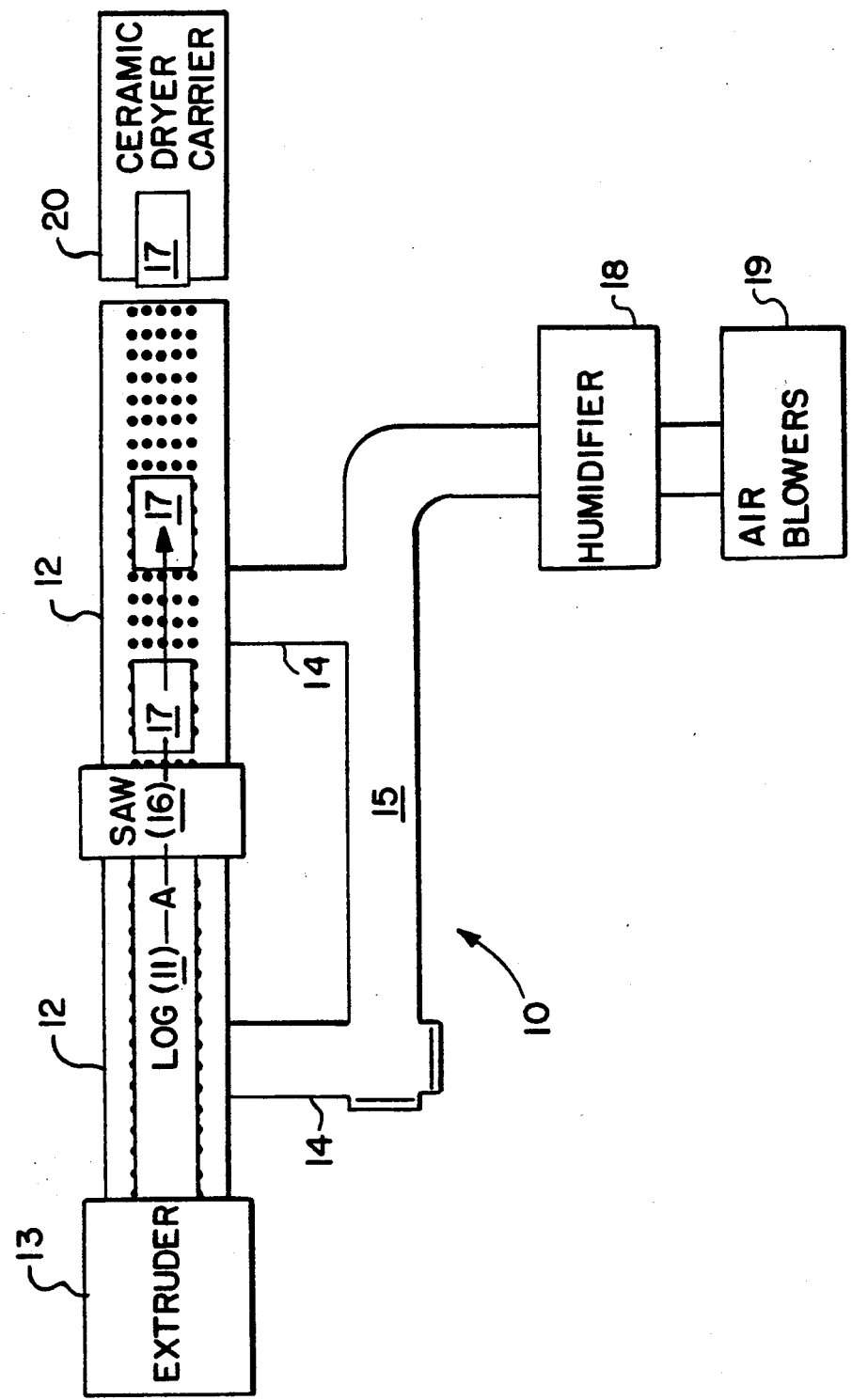
FIG. 1 depicts a top view of the gaseous fluid (air) bearing system used to convey the ceramic substrate from an extruder to a dryer carrier, in accordance with the present invention.

Now referring to FIG. 1, an air bearing system 10 is shown. A log 11 is directed over a guide path A (arrow) of the air bearing system 10, after having left the extruder 13. The air bearing system 10 comprises a series of air bearing support chambers 12 that are each supplied with air through individual conduits 14, each of which is connected to a common air supply pipe 15. A mechanical saw 16, whose velocity matches that of the log 11, is used to cut the log into pieces 17 of uniform length.

Air blowers 19 and a humidifier 18, such as Model No. CES-012AS010-483 Chromalox electric boiler manufactured by Emerson Electric Co. (Pittsburgh, PA) and Model No. LB-10 manufactured by Electro-Steam Generator Corp. (Alexandria, VA), are disposed in a common air supply pipe 15 upstream of the individual conduits 14, for maintaining the proper velocity and range of relative humidity for the air being supplied to the air bearing system 10. As aforementioned, the proper range of humidity must be maintained at the contact or support surface of the log 11 or pieces thereof 17 in order to prevent the log from developing fissures as it travels to a subsequent dryer carrier 20. The relative humidity has been found to lie within the approximate range of between 85 to 97%, with the preferred range being between 90 and 95%, at approximate operating temperatures of between 65 and 105° F.

Figure 2:
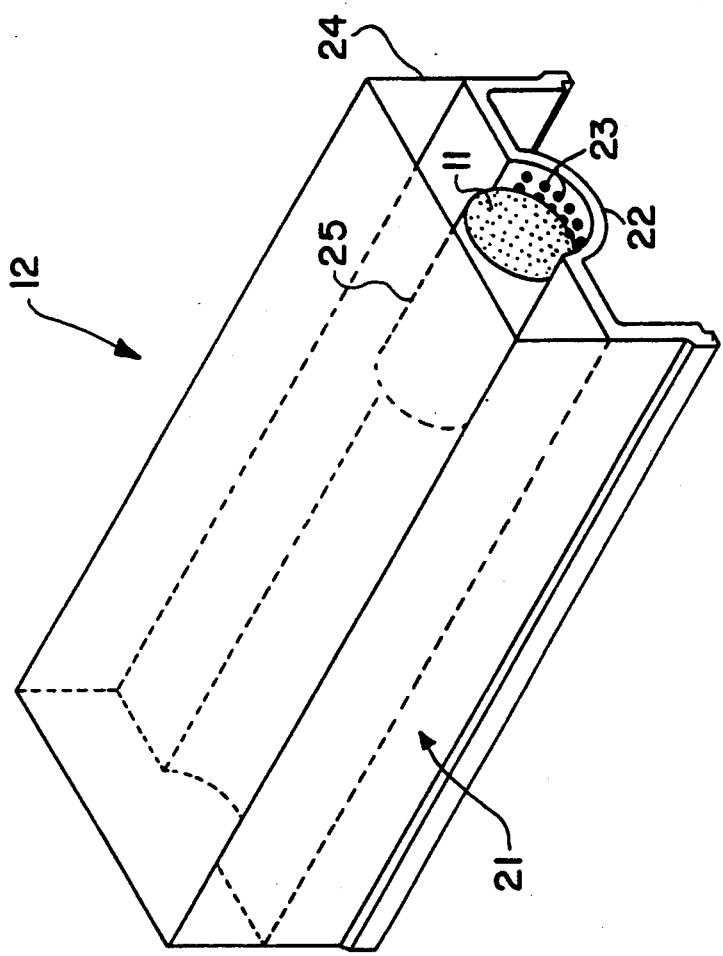
FIG. 2 illustrates a perspective view of a section of the gaseous fluid (air) bearing system shown in FIG. 1, depicting the jet aperture support surface overlayed with the protective mantle.

Referring to FIG. 2, a section 21 of one of the air bearing support chambers 12 is illustrated. Section 21 comprises a support surface 22 that is contoured to the surface of the log 11, for carrying and conveying it. The support surface 22 has a plurality of apertures 23 disposed therein, through which the humidified air is forced under pressure. A rectangular mantle 24 comprising a see-through plastic, such as Lexan, is disposed over the log 11 and support surface 22, in order to confine the humidified air about the log 11.

The mantle 24 surrounds the log 11, and ensures that the relative humidity of the surrounding air is held within the acceptable humidity range. The logs 11 traveling through the air bearing system 10 are maintained in a substantially constant drying environment, thus preventing the formation of fissures in the outer skin 25 of the log 11.

Production experiments were run to demonstrate the effect of high humidity air, flowing in the air bearing, on the occurrence of fissures in the log samples. Table I shows the results of those tests. Run G occurred during a period of unstable humidity and it is uncertain what humidity level was actually present at the time the log samples were taken. From the remaining runs, however, it can be seen that all samples from runs with a humidity level below 85% relative humidity (C, D and H) had fissures and only a low percentage of samples (0-12.5%) from runs with a humidity level above 85% relative humidity (A, B, E, F, I, J, K and L) had fissures. It was also noted in these experiments that, during runs in which the relative humidity was 97% or higher (E, F, I, K and L), the sample logs tended to stick to the air bearings.

TABLE I

| | Humidification Data | | |
|---|---|---|---|
| Run | Air Temp (F.) | Relative Humidity (%) | % of Pieces with Fissures |
| A | 84.6 | 93 | 0 |
| B | 69.3 | 96 | 5 |
| C | 64.6 | 77 | 100 |
| D | 104.5 | 71 | 100 |
| E | 93.2 | *98 | 10 |
| F | 91.4 | *97 | 5 |
| G | 96.8 | **61-87 | 0 |
| H | 66.2 | 67 | 100 |
| I | 75.2 | *97 | 12.5 |
| J | 76.9 | 96 | 0 |
| K | 92.7 | *97 | 0 |
| L | 77.2 | *97 | 0 |

*Logs tend to stick to air bearing.
**Relative humidity condition was unstable.

Since other modifications and changes could be varied to fit particular operating requirements and environments and would be apparent to those skilled in the art, the invention is not considered limited to the example chosen for purposes of disclosure, and covers all changes and modifications which do not constitute departures from the true spirit and scope of this invention.

Having thus described the current invention, what is desired to be protected by Letters Patent is presented by the subsequently appended claims.

What is claimed is:

1. An apparatus for preventing or substantially reducing the formation of cracks and fissures in a ceramic body comprising:

a forming member for shaping a ceramic batch into a green ceramic body, the forming member having an exit or outlet end;

support member abutting said forming member immediately adjacent to the exit end of the forming member, said support member having a plurality of apertures;

a mantle substantially surrounding the support member to form an enclosed support chamber, said apertures of the support member opening into said chamber;

means for passing or conveying the green ceramic body through said chamber immediately as the body exits the forming member;

means for supplying and maintaining air under pressure and at a relative humidity to said support chamber through said apertures to provide an air cushion to support the ceramic body within said chamber and to prevent the formation of cracks and fissures on the surface of the ceramic body.

2. The apparatus of claim 1, wherein the means for supplying said air further comprises humidifying means for adding moisture to said air.

3. The apparatus of claim 2, wherein said humidifying means maintains a relative humidity of said air in an approximate range of 85 to 97%.

4. The apparatus of claim 2, wherein said humidifying means maintains a relative humidity of said air in an approximate range of 90 to 95%.

5. The apparatus of claim 1, wherein said support member is contoured to the shape of the green ceramic body.

6. The apparatus of claim 1, wherein said support member further comprises a humidifying means, said humidifying means maintaining the relative humidity of the air within the chamber sufficient to prevent the formation of fissures upon the surface of the green ceramic body.

7. The apparatus of claim 6, wherein said humidifying means maintains a relative humidity of said air within said chamber in an approximate range of 85 ti 97%.

8. The apparatus of claim 6, wherein said humidifying means maintains a relative humidity of said air within said chamber in an approximate range of 90 to 95%.

* * * * *

UNITED STATES PATENT AND TRADEMARK OFFICE
CERTIFICATE OF CORRECTION

PATENT NO. : 5,205,991
DATED : April 27, 1993
INVENTOR(S) : James F. Avery et al.

It is certified that error appears in the above-indentified patent and that said Letters Patent is hereby corrected as shown below:

Claim 7, column 6, line 15, "ti" should read --to--.

Signed and Sealed this

Fifteenth Day of March, 1994

Attest:

BRUCE LEHMAN

Attesting Officer    Commissioner of Patents and Trademarks